United States Patent
Sood et al.

(10) Patent No.: US 7,463,607 B2
(45) Date of Patent: Dec. 9, 2008

(54) APPARATUS, SYSTEM AND METHOD CAPABLE OF PRE-ALLOCATING AND COMMUNICATING IP ADDRESS INFORMATION DURING WIRELESS COMMUNICATION

(75) Inventors: Kapil Sood, Beaverton, OR (US); Jesse Walker, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 345 days.

(21) Appl. No.: 11/107,261

(22) Filed: Apr. 15, 2005

(65) Prior Publication Data

US 2006/0233128 A1 Oct. 19, 2006

(51) Int. Cl.
*H04L 12/28* (2006.01)
(52) U.S. Cl. ...................... 370/331; 709/220
(58) Field of Classification Search ............ 370/328, 370/331; 709/220
See application file for complete search history.

(56) References Cited

U.S. PATENT DOCUMENTS

| | | | | |
|---|---|---|---|---|
| 2002/0136226 A1* | 9/2002 | Christoffel et al. | ......... | 370/401 |
| 2006/0018281 A1* | 1/2006 | Sadot et al. | ......... | 370/331 |
| 2006/0047791 A1* | 3/2006 | Bahl | ......... | 709/220 |
| 2007/0002833 A1* | 1/2007 | Bajic | ......... | 370/352 |

OTHER PUBLICATIONS

Han, Y., et al., IEEE "Design and Evaluation of an Address Configuration and Confirmation Scheme for IPv6 Mobility Support," pp. 1270-1275, (2004).
Shen, N., et al., *Network Working Group*, "DHCP Proxy Server Micro-block Allocation Scheme for IP Address Pool Managment", pp 1-9, (2004).
International Application No. PCT/US2006/014317, International Search Report and Written Opinion.

* cited by examiner

*Primary Examiner*—Edward Urban
*Assistant Examiner*—Adeel Haroon
(74) *Attorney, Agent, or Firm*—James S. Finnon; Intel Corporation

(57) ABSTRACT

An embodiment of the present invention provides a method of pre-allocating and communicating IP address information during wireless communication by an access point, comprising pre-caching by said AP a predetermined number of IP addresses from a backend Dynamic Host Configuration Protocol (DHCP) server. An embodiment may further comprise providing by said AP an IP subnet roaming information element that provides the IP Address that a wireless station (STA) will be obtaining if a wireless station (STA) roams to a particular AP and providing by said AP an IP subnet roaming information element that provides an IP subnet mask that determines the network address and host address portion of the IP addresses and providing by said AP provides an IP subnet roaming information element that provides that provides a Default gateway router address.

18 Claims, 2 Drawing Sheets

FIG. 1

| Element ID | Length | IP Address Field Length | IP Address | Subnet mask Field Length | Subnet mask | Default Gateway Router Field Length | Default Gateway Router | Lease Time |
|---|---|---|---|---|---|---|---|---|
| *1* | 1 | 1 | XX | 1 | XX | 1 | XX | 4 |

Octets:

100

APPARATUS, SYSTEM AND METHOD CAPABLE OF PRE-ALLOCATING AND COMMUNICATING IP ADDRESS INFORMATION DURING WIRELESS COMMUNICATION

BACKGROUND

Wireless networks and wireless communication have become prevalent throughout society creating the need for increased capacity and faster and more reliable wireless communication techniques. In wireless communication networks, mobile stations (STA) may connect to an Access Point (AP) to obtain network service. A STA could be considered "roaming" from one AP to the next AP for a number of reasons. With Voice over Internet Protocol (VoIP) and other real time multimedia applications, the essential roaming requires that a STA be able to quickly establish connection with the next AP without interrupting the network service. This may also include getting the IP sub-network address information from the next AP as it may be necessary to maintain continuous Internet Protocol (IP) layer connectivity for VoIP and other applications.

Thus, a strong need exists for an apparatus, system and method capable of pre-allocating and communicating IP address information during wireless communication

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates an IP Subnet Roaming Information Element of one embodiment of the present invention.

Figure 2:
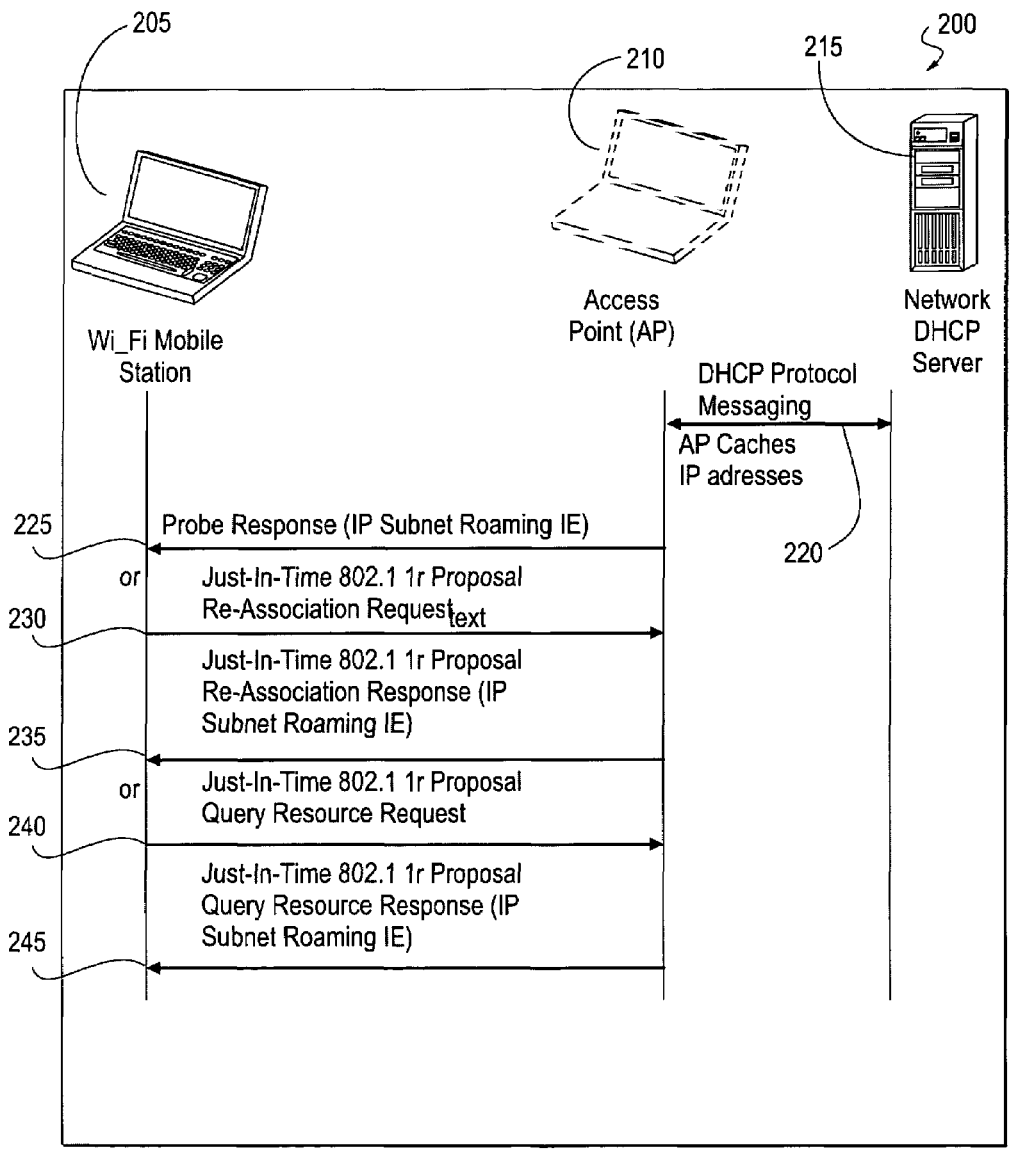
FIG. 2 illustrates an IP Subnet Roaming Information Message Exchange of one embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EE-PROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

Use of the terms "coupled" and "connected", along with their derivatives, may be used. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g. as in a cause an effect relationship).

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN, and the like).

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like.

An embodiment of the present invention provides a solution for inter IP-address roaming for wireless communication devices, such as but not limited to, the Institute for Electronics and Electrical Engineers (IEEE) 802.11 wireless stations, using for example, but not limited to, MAC layer messaging. The present invention may provide mechanisms for inter IP domain roaming. In addition, an embodiment of the present invention may provide an IP address caching scheme at Access Points, so that roaming stations can preview their new IP layer characteristics at roaming time. Also, the binding of DHCP lease with PMKID lifetime is provided in an embodiment of the present invention.

An embodiment of the present invention provides a mechanism for a wireless station (STA) to gather IP layer address and sub-network information from the next potential Access Point (AP) during roaming. This information includes a STA's new IP address, new subnet mask, default gateway router address, and lease time of the new IP address. An embodiment of the present invention prescribes that the next AP pre-cache a number of IP addresses from the backend Dynamic Host Configuration Protocol (DHCP) server. Pre-caching IP addresses from the backend DHCP server at the next AP may prevent the STA from performing expensive DHCP messaging to the backend DHCP server at roaming time.

Thus, an embodiment of the present invention enables wireless clients to select the next Access Point in the multi-cell overlapped environment and improve roaming performance for time bounded traffic. Determining whether the wireless client decides to roam to a new IP subnet and IP address, associated with the next AP, may impact overall application performance. The present invention may minimize roaming impact, improve overall roaming efficiency and application performance. Further, an embodiment of the present invention may be used in handheld wireless devices and mobile platforms to enhance Voice of Internet Protocol (VoIP) performance and enable a richer wireless local area network (LAN) experience for real time multimedia mobile users; although it is understood that the present invention is not limited to these uses and are merely illustrative the possibilities.

In an embodiment of the present invention, the information that the IP subnet roaming information element for the Access Point should provide may include the following:

a. IP Address: This is the new IP address that the STA will be obtaining if the STA roams to a particular AP.

b. IP subnet mask: The IP subnet mask determines the network address and host address portion of the IP addresses. This will indicate the number of bits in the subnet mask.

c. Default gateway router address: This is the next hop router address on the new subnet.

d. Lease time: The next AP will allocate an IP address lease time which will be the shorter of that allocated by the DHCP administrator and the Pairwise Master Key Identifier (PMKID) validity time.

The flow for pre-caching of IP address information at the next APs may include the following in one embodiment of the present invention:

a. The next AP may pre-cache a limited number of IP address from the network DHCP server. Thus, the next AP would perform DHCP messaging with the DHCP server to procure IP addresses before potential wireless devices roam to this AP.

b. When a mobile wireless device performs Re-Association Request, Resource Query, or Resource Reservation, as defined in proposal for 802.11 r (it us understood that the preset invention is not limited to 802.11 r nor any particular requests, queries or reservations), with the next AP, then the next AP will indicate new IP address parameters to the mobile wireless device.

c. Once the wireless device decides to roam to this AP, it already has the new IP address, and can perform additional higher layer functionality necessary for roaming.

d. The next AP may remove this IP address from its list of pre-cached IP addresses, and may query the DHCP server to get some more IP addresses. Likewise, the AP may also release IP addresses that it pre-cached back to the DHCP server.

Turning now to FIG. 1, shown generally as 100, is an illustration of an IP Subnet Roaming Information Element of one embodiment of the present invention. The IP Subnet Roaming Information Element (IE) may be defined as shown in FIG. 1 for IPv4 and IPv6 networks (although it is understood that the present invention is not limited in this respect or to a particular IP version). "XX" refers to the variable length field, whose length is determined by the length field preceding that field. The Access Point may include a IP Subnet Roaming IE in the Beacons, and/or Probe request/responses to advertise its roaming capability. The Access Point may also include an IP Subnet Roaming IE in the Action, Re-Association, Query messages, or Reservation messages as STA requests.

Referring now to FIG. 2, shown generally as 200 is an illustration of an IP Subnet Roaming Information Message Exchange of one embodiment of the present invention which depicts the message flow path. Access Point 210 uses DHCP messaging to communicate with Network DHCP server 215 in order for Access Point 210 to cache IP addresses. A probe response (IP subnet Roaming IE) 225 is sent from Access Point 210 to Wi-Fi Mobile Station 205. It is appreciated that the present invention is not limited to any particular wireless devices and a Wi-Fi wireless device is used herein for illustrative purposes only. Or a just-in-time 802.11r Proposal Re-Association Request may be sent from mobile station 205 to AP 210. Again, it is understood that the present invention is not limited to 802.11 r or any particular wireless standard.

A Just-In-Time Proposal Re-Association Response (IP Subnet Roaming IE) may then be sent from AP 210 to STA 205 or a Just-In-Time Proposal Query Resource Response (IP subnet roaming IE) may be sent from the STA 205 to AP 210. Subsequently, a Just-In-Time Proposal Query Resource Response (IP Submet Roaming IE) may be sent from AP 210 to STA 205. Again, it is understood that the present invention is not limited to 802.11r Just-In-Time proposal or any particular wireless standard.

An embodiment of the present invention enables a wireless device (such as, but not limited to Wi-Fi 802.11 wireless mobile devices) to roam to a next AP which may be part of a new IP subnet. In this case, the mobile device will need to know if it has crossed the IP address subnet boundary, and if so, get a new IP address. This problem is not being addressed currently in existing wireless communications. An embodiment of the present invention may inform the wireless device apriori that it may be crossing into a new IP address subnet.

Existing art has not provided a mechanism with which to indicate the potential new IP address to the roaming wireless client devices. An embodiment of the present invention provides a solution for wireless clients to get a new IP address within a wireless framework (such as, but not limited to the 802.11 framework). By providing that the next AP pre-cache a limited number of IP addresses from the backend network DHCP server, this will prevent a mobile wireless device from performing time consuming and complete DHCP messaging at the time it is roaming. The next AP will be able to allocate one of the cached IP addresses to the mobile station.

5. An embodiment of the present invention may tie the DHCP lease time with the lifetime of the PMKID at the AP and STA and may limit the liveness of the IP address to be bound by the lifetime prescribed by the DHCP administrator, or by the lifetime of the PMKID, whichever is shorter. This is then, communicated to the station in the prescribed messages. Thereby, a mechanism for a STA to gather IP subnet roaming information from next potential Access Point, such as, next potential Access Point's IP subnet information, default router, and potential Wi-Fi station's new IP address information is enabled. A wireless station, such as a Wi-Fi station, may use this information to decide if it would like to roam to a new IP subnet and may prepare the upper layer network stack and applications for IP mobility.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. An apparatus, comprising:
an access point (AP) capable of allocating and communicating IP address information during wireless communication by said AP pre-caching a predetermined number of IP addresses from a backend Dynamic Host Configuration Protocol (DHCP) server;
at least one additional AP, wherein said at least one additional AP uses the following flow for pre-caching IP address information at said at least one additional AP;
said at least one additional AP pre-caches a limited number of IP address from a network DHCP server with said at least one additional AP thereby performing DHCP messaging with DHCP server to procure IP addresses before a potential wireless device roams to said at least one additional AP;
when a mobile wireless device performs Re-Association Request, Resource Query, or Resource Reservation with said at least one additional AP, then said at least one additional AP will indicate new IP address parameters to said mobile wireless device;
once said wireless device decides to roam to an AP, it already has the new IP address, and can perform additional higher layer functionality necessary for roaming; and
said at least one additional AP removes this IP address from its list of pre-cached IP addresses, and can query DHCP server to get some more IP addresses.

2. The apparatus of claim 1, wherein said AP provides an IP subnet roaming information element that provides the IP Address that a wireless station (STA) will be obtaining if a wireless station (STA) roams to a particular AP.

3. The apparatus of claim 1, wherein said AP provides an IP subnet roaming information element that provides an IP subnet mask that determines the network address and host address portion of the IP addresses.

4. The apparatus of claim 1, wherein said AP provides an IP subnet roaming information element that provides that provides a Default gateway router address.

5. The apparatus of claim 1, further comprising at least one additional AP wherein said at least one additional AP will allocate an IP address lease time which will be shorter than that allocated by the DHCP administrator and the Pairwise Master Key Identifier (PMKID) validity time.

6. The apparatus of claim 1, wherein said Access Point is capable of including an IP Subnet Roaming information element in a Beacon, and/or Probe request/response to advertise its roaming capability.

7. The apparatus of claim 1, wherein said Access Point is capable of including an IP Subnet Roaming IE in the Action, Re-Association, Query messages, or Reservation messages as an STA request.

8. A method of allocating and communicating IP address information during wireless communication by an access point (AP), comprising:
pre-caching by said AP a predetermined number of IP addresses from a backend Dynamic Host Configuration Protocol (DHCP) server;
using the following flow for pre-caching IP address information by at least one additional AP;
said at least one additional AP pre-caches a limited number of IP address from a network DHCP server with said at least one additional AP thereby performing DHCP messaging with DHCP server to procure IP addresses before a potential wireless device roams to said at least one additional AP;
when a mobile wireless device performs Re-Association Request, Resource Query, or Resource Reservation with said at least one additional AP, then said at least one additional AP will indicate new IP address parameters to said mobile wireless device;
once said wireless device decides to roam to an AP, it already has the new IP address, and can perform additional higher layer functionality necessary for roaming; and
said at least one additional AP removes this IP address from its list of pre-cached IP addresses, and can query DHCP server to get some more IP addresses.

9. The method of claim 8, further comprising providing by said AP an IP subnet roaming information element that provides the IP Address that a wireless station (STA) will be obtaining if a wireless station (STA) roams to a particular AP.

10. The method of claim 8, further comprising providing by said AP an IP subnet roaming information element that provides an IP subnet mask that determines the network address and host address portion of the IP addresses.

11. The method of claim 8, further comprising providing by said AP provides an IP subnet roaming information element that provides a Default gateway router address.

12. The method of claim 8, further comprising providing at least one additional AP wherein said at least one additional AP will allocate an IP address lease time which will be shorter than that allocated by the DHCP administrator and the Pairwise Master Key Identifier (PMKID) validity time.

13. The method of claim 8, further comprising including by said Access Point an IP Subnet Roaming information element in a Probe request to advertise its roaming capability.

14. The method of claim 8, further comprising including by said Access Point an IP Subnet Roaming IL in the Action, Re-Association, Query messages, or Reservation messages as an STA request.

15. A computer readable medium encoded with a computer program, comprising:
a storage medium having stored thereon instructions, that, when executed by a computing platform results in:
allocating and communicating IP address information during wireless communication by an access point (AP), comprising:
pre-caching by said Access Point a predetermined number of IP addresses from a backend Dynamic Host Configuration Protocol (DHCP) server;
using the following flow for pre-caching IP address information by at least one additional AP:
said at least one additional AP pre-caches a limited number of IP address from a network DHCP server with said at least one additional AP thereby performing DHCP messaging with DHCP server to procure IP addresses before a potential wireless device roams to said at least one additional AP;
when a mobile wireless device performs Re-Association Request, Resource Query, or Resource Reservation with said at least one additional AP, then said at least one additional AP will indicate new IP address parameters to said mobile wireless device;
once said wireless device decides to roam to an AP, it already has the new IP address, and can perform additional higher layer functionality necessary for roaming; and
said at least one additional AP removes this IP address from its list of pre-cached IP addresses, and can query DHCP server to get some more IP addresses.

16. The computer readable medium of claim 15, further comprising providing by said AP an IP subnet roaming information element that provides the IP Address that a wireless station (STA) will be obtaining if a wireless station (STA) roams to a particular AP.

17. The computer readable medium of claim 15, further comprising providing by said AP an IP subnet roaming information element that provides an IP subnet mask that determines the network address and host address portion of the IP addresses.

18. The computer readable medium of claim 15, further comprising providing by said AP provides an IP subnet roaming information element that provides that provides a Default gateway router address.

* * * * *